(12) United States Patent
Mahmoud et al.

(10) Patent No.: US 7,301,904 B1
(45) Date of Patent: Nov. 27, 2007

(54) SYSTEM AND METHOD FOR MAXIMIZING THROUGHPUT IN A TELECOMMUNICATIONS SYSTEM

(75) Inventors: Ashraf Sharif Hasan Mahmoud, Napean (CA); Osama M. Kubbar, Napean (CA); Miroslav Budic, Murphy, TX (US)

(73) Assignee: Nortel Networks Limited, St. Laurent, Quebec (CA)

(*) Notice: Subject to any disclaimer, the term of this patent is extended or adjusted under 35 U.S.C. 154(b) by 975 days.

(21) Appl. No.: 10/185,411

(22) Filed: Jun. 28, 2002

(51) Int. Cl.
*H04L 12/26* (2006.01)
(52) U.S. Cl. ...................... 370/232; 370/252
(58) Field of Classification Search ............... 370/229, 370/230, 232, 241, 252, 253, 465
See application file for complete search history.

(56) References Cited

U.S. PATENT DOCUMENTS

| | | | | |
|---|---|---|---|---|
| 5,982,813 | A * | 11/1999 | Dutta et al. | 375/219 |
| 6,084,917 | A * | 7/2000 | Kao et al. | 375/260 |
| 7,106,715 | B1 * | 9/2006 | Kelton et al. | 370/338 |
| 2002/0105925 | A1 * | 8/2002 | Shoemake | 370/330 |
| 2003/0043732 | A1 * | 3/2003 | Walton et al. | 370/208 |

OTHER PUBLICATIONS

Ulukus, S.; Greenstein, L.J., "Throughput maximization in CDMA uplinks using adaptive spreading and power control," Spread Spectrum Techniques and Applications, 2000 IEEE Sixth International Symposium on , vol. 2, No. pp. 565-569 vol. 2, 2000.*

Jafar, S.A.; Goldsmith, A., "Adaptive multicode CDMA for uplink throughput maximization," Vehicular Technology Conference, 2001. VTC 2001 Spring. IEEE VTS 53rd , vol. 1, No. pp. 546-550 vol. 1, 2001.*

Ishiba, M.; Satoh, H.; Kobayashi, T., "Multi-class packet multiplexing scheme for wireless Internet over CDMA systems," Radio and Wireless Conference, 2001. RAWCON 2001. IEEE , vol., No. pp. 73-76, 2001□□.*

Arthur W. Berger, "Overload Control Using Rate Control Throttle: Selecting Token Bank Capacity for Robustness to Arrival Rates", IEEE Transactions on Automatic Control, vol. 36, No. 2, Feb. 1991, pp. 216-219.

* cited by examiner

*Primary Examiner*—Doris H. To
*Assistant Examiner*—Kerri M Rose
(74) *Attorney, Agent, or Firm*—Haynes and Boone, LLP

(57) ABSTRACT

Provided is a system and method for maximizing throughput in a telecommunications network. The method is operable to select and service a request for a communication session by selecting a bit rate and assigning the bit rate to the request. The method selects the request from a pool of queued requests and the bit rate from all supported bit rates. The request and bit rate are selected based on calculations that determine an amount of power needed for each queued request at each bit rate. The calculations result in ratios representing each combination of power and bit rate for each request. The method selects the ratio having the highest number of bit rates per power unit and assigns the bit rate to the associated request. This approach enables the method to select a queued request according to current network constraints and so provides an optimal approach that maximizes throughput.

15 Claims, 3 Drawing Sheets

SYSTEM AND METHOD FOR MAXIMIZING THROUGHPUT IN A TELECOMMUNICATIONS SYSTEM

BACKGROUND OF THE INVENTION

The following disclosure relates generally to communications systems and, more particularly, to maximizing throughput in a telecommunications system.

Telecommunications systems, such as code division multiple access (CDMA) systems, may face a variety of constraints that limit the throughput of the system while servicing requests. The constraints may include resource limitations such as a maximum amount of available power or a maximum available bit rate. For example, a bit rate used to service a request may require a certain amount of power. However, even if the required amount of power is available, assigning the power to the request may result in an inadequate amount of power for other requests. Furthermore, operation at high power levels may create interference that adversely affects the system as a whole.

In addition, assigning a maximum available bit rate to a request may result in wasted power and throughput opportunities during "idle times" (e.g., when no transmission is occurring). This may be particularly undesirable when the requests are for data burst transmissions, which tend to need relatively high bit rates and amounts of power for a brief period of time. However, due to the underlying network structure and other factors, the bit rate and the required power may be selected for the communication session without regard to maximizing the throughput based on the system's resource levels.

Current approaches for maximizing throughput are inadequate for a variety of reasons. For example, in some approaches, the network may include contention based algorithms that provide a relatively low to moderate level of throughput due to idle time wasted during the contention process. Other approaches may use burst allocation algorithms that implement a first-come first-served or a round robin methodology, both of which may lack efficiency and versatility. In addition, the network itself may be based on a CDMA derivative such as High Data Rate (HDR), which relies on multiplexing data users over a single channel.

Therefore, what is needed is a system and method for maximizing the throughput of a telecommunications system by selecting a bit rate for a request based on a current level of system resources.

SUMMARY OF THE INVENTION

In one embodiment, a method for maximizing throughput in a telecommunications system constrained by a maximum amount of power is provided, where the telecommunications system utilizes one of multiple transfer rates to service a request. The method includes calculating a first power level based on an amount of power needed to support the request at one of the transfer rates. A metric is calculated based on the transfer rate and the power level. The metric is compared to a threshold to determine whether the metric exceeds the threshold and the transfer rate is assigned to the request if the metric exceeds the threshold.

Other aspects and features of the present disclosure will become apparent to those ordinarily skilled in the art upon review of the following description of specific embodiments of the disclosure in conjunction with the accompanying figures.

DETAILED DESCRIPTION OF A PREFERRED EMBODIMENT

Figure 1:
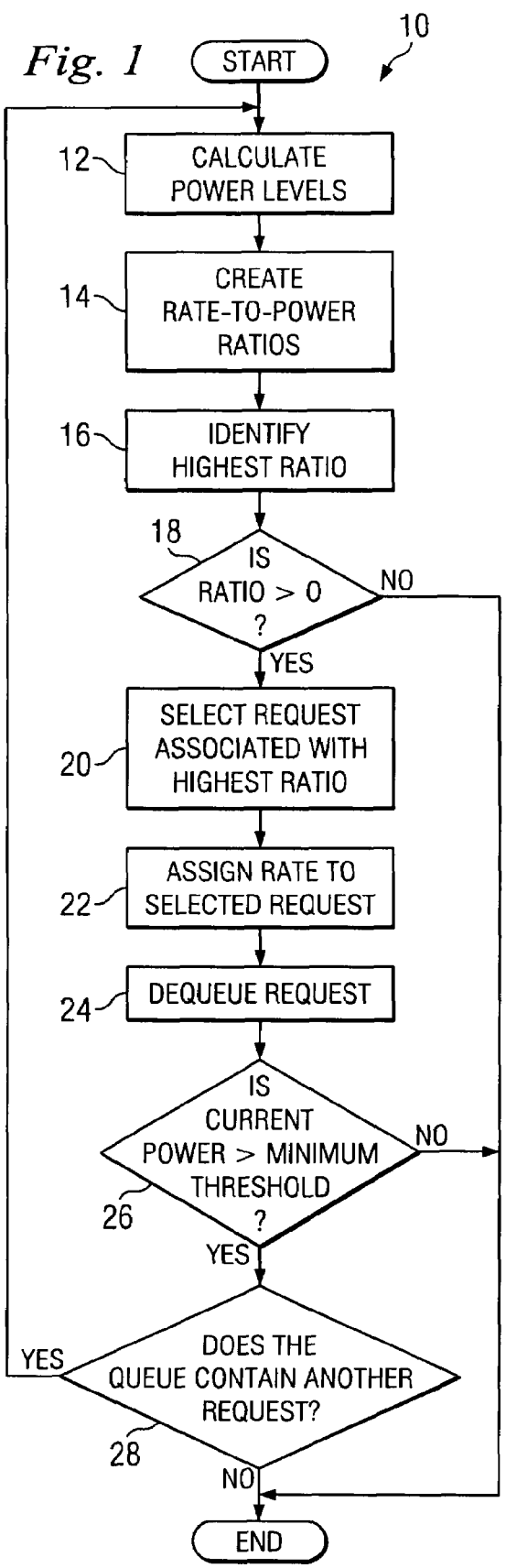
FIG. 1 is a flowchart of a method for selecting one of a plurality of bit rates based on a telecommunications system's resource levels.

The present disclosure relates generally to communications systems and, more particularly, to maximizing throughput in a telecommunications system. It is understood, however, that the following disclosure provides many different embodiments or examples. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Referring to FIG. 1, in one embodiment, a method 10 is operable to select and service a queued request for a communication session in a telecommunications system by selecting an optimal transfer rate and assigning the transfer rate to the request. As will be described later in greater detail using specific examples, the method 10 selects the request from a pool of queued requests and the transfer rate from a plurality of transfer rates. The request and transfer rate are selected based on calculations that determine an amount of power needed for each queued request at each transfer rate supported by the system. This approach enables the method 10 to select a queued request according to current system constraints and so provides an optimal approach that maximizes system throughput.

The method 10 begins in step 12 by calculating a power level (e.g., an amount of power) needed to support each queued request at each transfer rate. If the power level needed to support a particular transfer rate for a request is not available at the time the calculation occurs, the power level for that combination of transfer rate and request is set to infinity. In step 14, the transfer rates supported by the system are divided by the power levels calculated in step 12 to create rate-to-power ratios for each request at each transfer rate. The highest ratio (e.g., the ratio representing the highest data transfer per power unit) is identified in step 16 and a determination is made in step 18 as to whether the highest ratio is greater than zero. If the highest ratio is not greater than zero, the method 10 ends because there is insufficient power to service any of the queued requests at any transfer rate.

If the highest ratio is greater than zero, the method 10 continues to steps 20 and 22, where the request associated with the highest ratio is selected and the transfer rate is assigned to the request. In step 24, the selected request is dequeued and a current power level is compared to a minimum power threshold level in step 26. The minimum power threshold defines, for example, a minimum amount of power needed to service any request. If the current power level is less than the minimum power threshold, the method 10 ends. If the current power level is greater than the minimum power threshold, the method continues to step 28. In step 28, the method determines whether more queued requests exist and, if so, returns to step 12.

Figure 2:
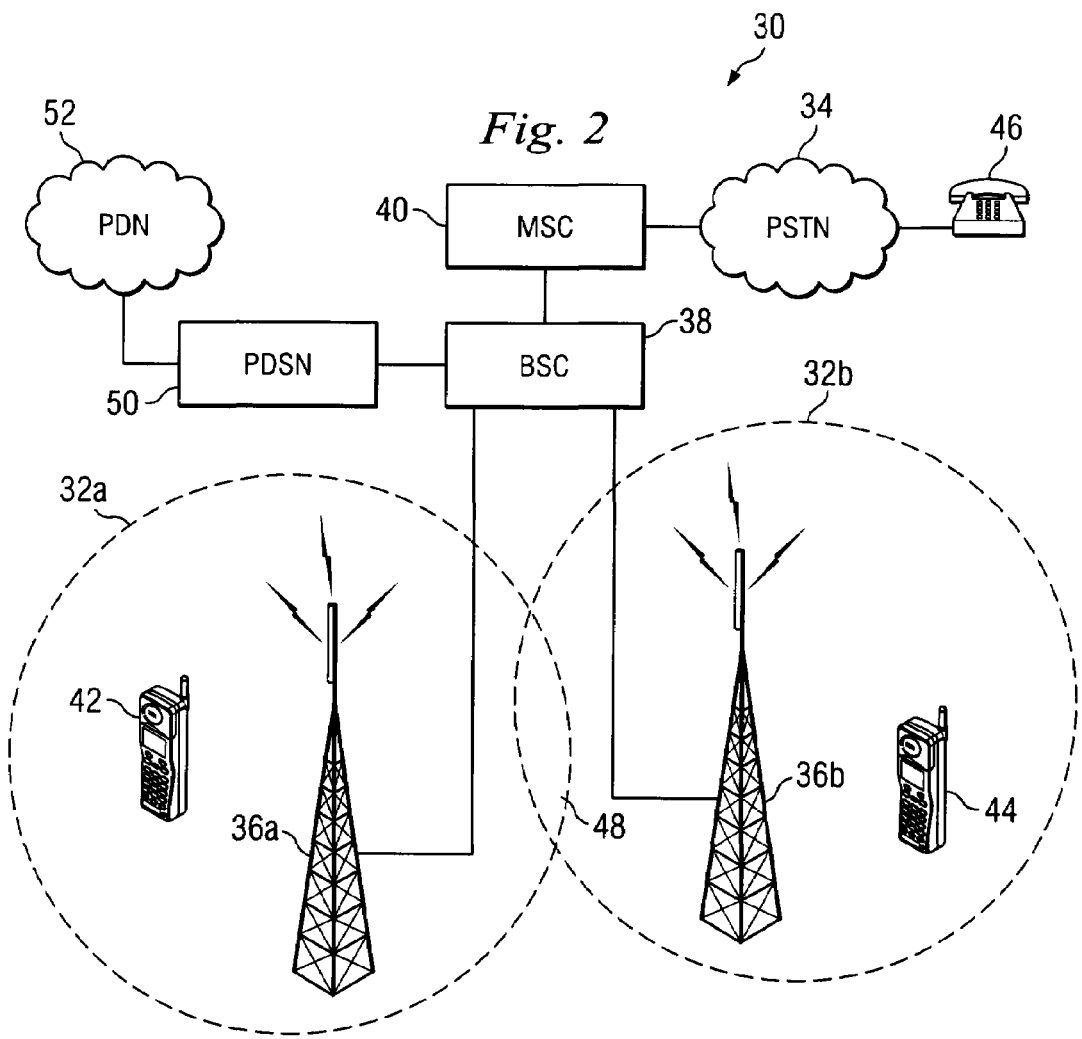
FIG. 2 is a diagram of an exemplary telecommunications network within which the selection of a bit rate may be practiced.

Referring now to FIG. 2, in another embodiment, a telecommunications network 30 illustrates a system in which the method described in reference to FIG. 1 may be practiced. The network 30 comprises a plurality of cells 32a, 32b, which, for purposes of clarity, are omni-cells (e.g., not sectorized). In general, a cell may contain more than one sector if the cell is not an omni-cell. For instance, a tri-sectored cell contains three sectors. In the present example, the network 30 is a wireless network, and may be connected to other wireless and/or wireline networks, such as a Public Switched Telephone Network (PSTN) 34 and a Packet Data Network (PDN) 52. Each cell 32a, 32b in the network 30 includes a base transceiver station (BTS) 36a, 36b, respectively, which is connected to a base station controller (BSC) 38. A mobile switching center (MSC) 40 may be used to connect the network 30 with other networks such as the PSTN 34, while a Packet Data Serving Node (PDSN) 50 may connect the network 30 to the PDN 52.

The network 30 enables at least one mobile device 42 to establish a communication session with another mobile device 44 via the BTS 36a associated with the cell 32a in which the mobile device 42 is located. For example, a request to establish a burst transmission session by the mobile device 42 may be directed by the PDSN 50 to (1) the second mobile device 44 registered with the PDSN 50 and within range of one of the BTSs 36a, 36b, (2) a voice terminal 46 coupled to the PSTN 34, or (3) a data terminal (not shown) coupled to the PDN 52. For example, if the communication session is a data transfer session, the request may be to connect the mobile device 42 to a computer or other data device via the network 30. It is noted that the mobile device 42, while illustrated as a mobile telephone, may be any mobile device capable of communicating via the network 30.

The cells 32a, 32b overlap so that the mobile device 42 may travel from one cell to another (e.g., from the cell 32a to the cell 32b) while maintaining a communication session. In a "handoff" region 48 (e.g., the area where the cells 32a, 32b overlap), the mobile device 42 may be serviced by both the BTS 36a and the BTS 36b.

In the present example, the network 30 is a radio frequency (RF) network based on code division multiple access (CDMA), which may be compatible with a variety of standards including, but not limited to, Interim Standard 95 (IS-95), Interim Standard 2000 (IS-2000), and Universal Mobile Telecommunications System (UMTS). Each standard may be further divided into a plurality of different protocols. For example, IS95 may include Radio Configuration 1 (RC1) and RC2 (also known as Rate Set 1 (RS1) and Rate Set 2 (RS2)), while IS2000 may be backwards compatible with RC1 and RC2 and also include RC3, RC4, and RC5. Other known differences may exist between the standards. For purposes of example, the network 30 is compatible with IS2000, although it is understood that many different protocols and standards may be utilized to establish a variety of communication session types. Furthermore, the network 30 includes support for multiple supplemental channels that may transfer data at speeds of 307.2 kilobits per second (kbps) and that may be shared among multiple data users.

The network 30 includes a buffer (not shown) that is operable to receive and store communication session requests. The buffer may be disposed in the BTS 36a, 36b, the BSC 38, or elsewhere depending on the degree of distribution desired. The buffer may be formed from multiple buffers and, in some embodiments, the multiple buffers may be assigned priorities so that requests in higher priority buffers are processed before requests in lower priority buffers. It is noted that the multiple buffers may be distributed throughout the network 30. An algorithm for implementing the method 10 of FIG. 1 may be similarly stored and executed as desired by a processing means located at the BTS 36a, 36b, BSC 38, or elsewhere.

Figure 3:
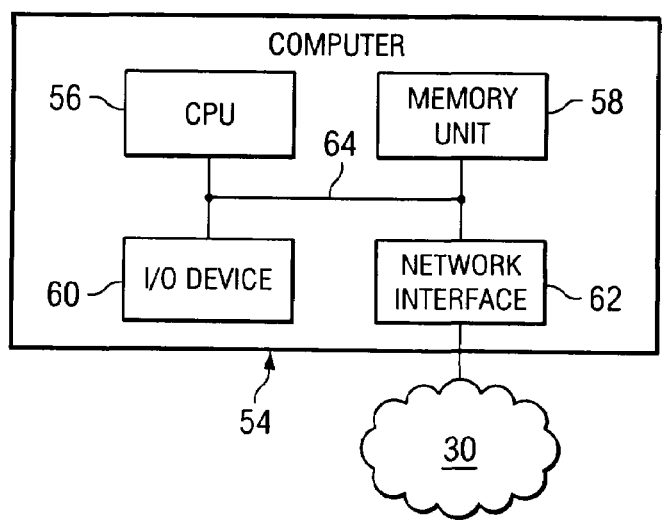
FIG. 3 is a schematic view of a computer that may be used within the network of FIG. 2 to execute the method of FIG. 1.

Referring now to FIG. 3, an exemplary computer 54, such as may be used in the network 30 of FIG. 2, is illustrated. The computer 54 may include a central processing unit ("CPU") 56, a memory unit 58, an input/output ("I/O") device 60, and a network interface 62. The components 56, 58, 60, and 62 are interconnected by a bus system 64. It is understood that the computer may be differently configured and that each of the listed components may actually represent several different components. For example, the CPU 56 may actually represent a multi-processor or a distributed processing system; the memory unit 58 may include different levels of cache memory, main memory, hard disks, and remote storage locations; and the I/O device 60 may include monitors, keyboards, and the like.

The computer 54 may be connected to the network 30 via the network interface 62. Because the computer 54 may be connected to the network 30, certain components may, at times, be shared with other computers (not shown). Therefore, a wide range of flexibility is anticipated in the configuration of the computer. Furthermore, it is understood that, in some implementations, the computer 54 may act as a server to other computers. Accordingly, the method 10 of FIG. 1 may be stored and executed solely on the computer 54 or may be divided among multiple computers and accessible via the network 30. In addition, the network 30 may comprise the bus system 64 and so the various components 56-62 may be distributed through the network 30.

Figure 4:
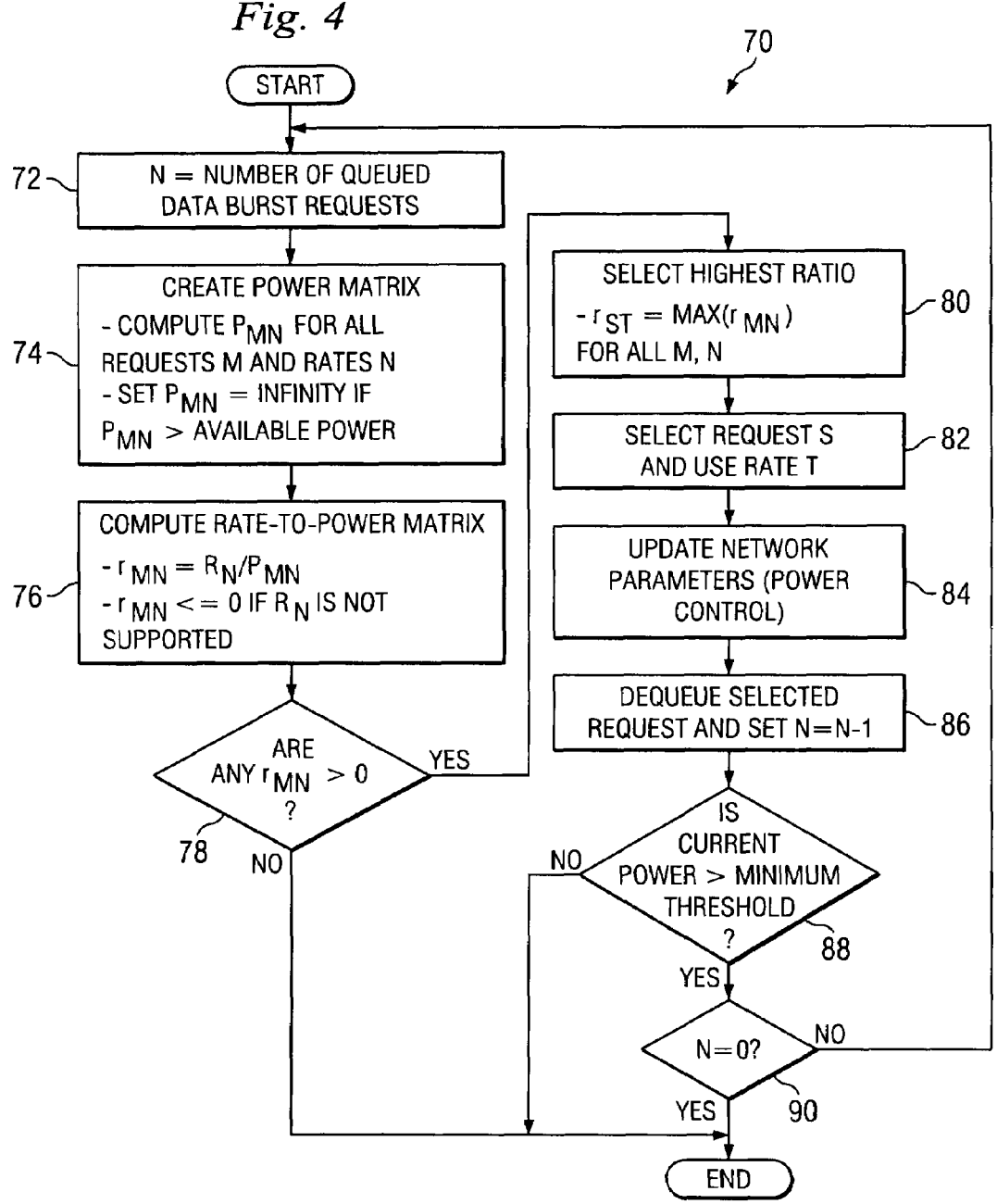
FIG. 4 is a flowchart illustrating a more detailed embodiment of the method of FIG. 1.

Referring now to FIG. 4, a method 70 is operable to maximize throughput on the network 30 of FIG. 2 by selecting a particular request from a queue of requests. The selection is based on calculations that may include multiple power levels and bit rates for each queued request. The requests, power levels, and bit rates are used to create matrices from which a request may be associated with an optimal bit rate. In the present example, the queued requests are for data burst transmissions and the method 70 is operable to schedule simultaneous data bursts. The implementation of the method 70 in the network 30 may be such that the method 70 is transparent on a forward link (e.g., a link from the network 30 to the mobile device 42) and so does not affect the compliance of the network 30 with CDMA standards.

The method 70 may be executed each time a new request is added to the buffer of the network 30 or each time power allocated to a call is released. The power release may occur, for example, when a fundamental channel or supplemental channel is released because a call is terminated, downgraded in a downgrade process, or a burst is finished. Accordingly, the power release triggers the method 70 to determine whether the released power is sufficient to service a queued request.

The method begins in step 72 by setting a variable N equal to the number of queued burst requests. In step 74 and as illustrated by Matrix 1 below, an M×N power matrix is created that includes all queued requests $U_1$-$U_M$ and all bit rates $R_1$-$R_N$ supported by the network. Each bit rate identifies a maximum number of kilobits per second that the network supports. For example, $R_1$ may represent a bit rate of 128 kbps while $R_2$ may represent a bit rate of 307.2 kbps. If a particular rate is not supported by the mobile device 42, the R is set to zero. For example, if the mobile device 42 does not support a bit rate of 128 kbps and $R_1$ represents 128 kbps, then $R_1$ would be set to zero to indicate its unavailability. This enables the method 70 to be used with mobile devices that do not support a full range of bit rates (e.g., with mobile devices that are not fully compliant with the IS2000 standard used in the present example).

$$\begin{array}{c} \\ U_1 \\ U_2 \\ \vdots \\ U_M \end{array} \begin{array}{cccc} R_1 & R_2 & \ldots & R_N \\ \begin{bmatrix} P_{11} & P_{12} & \ldots & P_{1N} \\ P_{21} & P_{22} & \ldots & P_{2N} \\ \vdots & \vdots & & \vdots \\ P_{M1} & P_{M2} & \ldots & P_{MN} \end{bmatrix} \end{array} \quad \text{Matrix 1}$$

To form the power matrix, the method 70 calculates the power level needed for each combination of queued request U and bit rate R. Generally, higher bit rates need more power than lower bit rates, so each bit rate may have a different power level than the bit rates that are higher and lower for a particular request. Furthermore, each request may have different power needs depending on the mobile's location, but generally a request for a high bit rate requires more power than a request for a low bit rate. Accordingly, each combination of queued request U and bit rate R may have a power level P, although it is understood that some combinations may be identical or virtually identical in terms of power levels.

To better describe Matrix 1, the power level $P_{12}$ will be described in greater detail. $P_{12}$ denotes the power level needed to service the first request $U_1$ at the second bit rate $R_2$. If there is not enough power to support a particular bit rate for a particular request, the power level for that combination of request and bit rate is set to infinity. Accordingly, if the system has insufficient power for the combination $U_1$ and $R_2$, then $P_{12}$ would be set to infinity.

Once the power level matrix has been created, the method 70 proceeds to step 76, where an M×N rate-to-power matrix is calculated as illustrated by Matrix 2. Matrix 2 is calculated using the general function f(R/P)=r (e.g., each bit rate R is divided by each entry $P_{11}$-$P_{MN}$ of Matrix 1), where the resulting elements $r_{11}$-$r_{MN}$ each signify a ratio of a number of transmitted bits over the air per energy unit. It is understood that the function f(R/P)=r is for purposes of illustration only and that alternate functions using a power level P and a bit rate R may be used in its place. If a rate $R_1$-$R_N$ is not supported by the mobile device, then the respective elements in the range $r_{11}$-$r_{MN}$ are zero.

$$\begin{array}{cccc} R_1 & R_2 & \ldots & R_N \\ \begin{bmatrix} P_{11} & P_{12} & \ldots & P_{1N} \\ P_{21} & P_{22} & \ldots & P_{2N} \\ \vdots & \vdots & & \vdots \\ P_{M1} & P_{M2} & \ldots & P_{MN} \end{bmatrix} \begin{bmatrix} r_{11} & r_{12} & \ldots & r_{1N} \\ r_{21} & r_{22} & \ldots & r_{2N} \\ \vdots & \vdots & & \vdots \\ r_{M1} & r_{M2} & \ldots & r_{MN} \end{bmatrix} \end{array} \quad \text{Matrix 2}$$

The elements $r_{11}$-$r_{MN}$ provided by Matrix 2 may be zero or greater than zero, and so Matrix 2 may be used to identify all the occurrences where the ratio of rate-to-power (e.g., R/P) is greater than zero. Accordingly, the method 70 continues to step 78, where a determination is made as to whether any of the elements $r_{11}$-$r_{MN}$ in the rate-to-power matrix are positive. If none of the elements are positive, the method 70 ends. If one or more of the elements are positive, the method 70 identifies the maximum element in the Matrix 2 (e.g., the ratio with the highest number of bits per energy unit) in step 80 and selects the request and burst rate associated with the identified element in step 82. For purposes of example, the element $r_{12}$ is the maximum element of the Matrix 2. Accordingly, the bit rate $R_2$ is assigned to the request $U_1$.

Network parameters related to power control may be updated in step 84 to reflect the new allowed burst. The request is dequeued in step 86 (e.g., $U_1$ is removed from the queue) and the variable N is decremented to reflect the lower queue count. In step 88, a current power level is compared to a minimum power threshold level which may, for example, define a minimum amount of power needed to service any request. If the current power level is less than the minimum power threshold, the method 70 ends. If the current power level is greater than the minimum power threshold, the method continues to step 90 and determines whether any requests remain in the queue. If requests do remain in the queue, the method 70 returns to step 72.

The method 70 may continue execution until all elements of the rate-to-power Matrix 2 are zero, which indicates that no further requests can be serviced because the amount of available power is lower than is required to service any request at any bit rate. In this manner, communication sessions may be established to service requests using bit rates that optimally balance usage of system resources.

In still another embodiment, the method 70 may include a means for allowing selection of a highest burst rate without regard to system optimization. For example, if there is little traffic on the network 30 (e.g., the network has a low traffic load), the method 70 may assign a high burst rate to a request even if the assigned burst rate does not represent the maximum rate-to-power ratio as calculated in step 76. This frees the network from the overhead of unnecessary calculations by selecting the highest burst rate supported by the available power when power optimization is not desired.

In yet another embodiment, additional factors may be included in the calculations. For example, the general function f(R/P)=r may be altered to include a traffic delay D, which may change the function to f(D, R/P). Additional matrices may or may not be needed to include the factors in the calculations, depending on the factors and their implementation in the method 70. For example, a utility function (UF) scheduling algorithm operable to implement an R/P approach may be characterized as:

$$UF = \gamma * W(t) * R(t)/P(t) \quad \text{Eq. 1}$$

where γ is a queuing priority and W is the waiting time. A general form of a modified utility function (MUF) utilizing a quality of service (QoS) controller $C_1$ and a capacity controller $C_2$ may be:

$$MUF(\gamma_i, w_i, R_i/P_i) = C_1 * \text{QoS\_Component} + C_2 * \text{Throughput\_Component} \quad \text{Eq. 2}$$

where $C_1 + C_2 = 100\%$. In this manner, the factors R and P may be used in a variety of ways to optimize performance as described above.

While the preceding description shows and describes one or more embodiments, it will be understood by those skilled in the art that various changes in form and detail may be made therein without departing from the spirit and scope of the present disclosure. For example, it is within the scope of the present disclosure that the BTS, the BSC, and/or the mobile device may not exist in the same fashion in other technologies or implementations, but the same functionality may be achieved using other components. In addition, other methods of obtaining or calculating factors such as the power levels or the rate-to-power ratios may be utilized in developing a desired solution. Therefore, the claims should be interpreted in a broad manner, consistent with the present disclosure.

What is claimed is:

1. A method for maximizing throughput in a telecommunications system constrained by a maximum amount of power, the telecommunications system operable to utilize one of a plurality of transfer rates to service a first request, the method comprising:
   calculating a first power level based on an amount of power needed to support the first request at a first transfer rate;
   calculating a first metric based on the first transfer rate and the first power level;
   comparing the first metric to a threshold to determine whether the first metric exceeds the threshold; and
   assigning the first transfer rate to the first request if the first metric exceeds the threshold;
   wherein the maximum amount of power is measured in power units and the first transfer rate is measured in data bits per time unit, and wherein the first metric represents a number of data bits that can be transferred per power unit; and
   wherein the first transfer rate is associated with a mobile device, and wherein the first transfer rate is set to zero if the first transfer rate is not supported by the mobile device.

2. The method of claim 1 wherein the threshold is a second metric based on a second transfer rate and a second power level, and wherein the second power level is based on an amount of power needed to support the first request at the second transfer rate.

3. The method of claim 1 further comprising:
   calculating a second power level based on an amount of power needed to support the first request at a second transfer rate;
   calculating a second metric between the second transfer rate and the second power level;
   determining whether the first metric or the second metric is greater; and
   assigning the first or second transfer rate associated with the greater metric to the first request.

4. The method of claim 3 further comprising creating a first matrix for calculating the first and second power levels.

5. The method of claim 4 further comprising creating a second matrix having first and second inputs for calculating the first and second metrics, wherein the first input includes the first matrix and the second input includes the first and second transfer rates.

6. The method of claim 1 wherein the first power level is set equal to infinity if the amount of power needed to support the first request at the first transfer rate is not available.

7. The method of claim 1 further comprising:
   calculating a second power level based on an amount of power needed to support a second request at a second transfer rate;
   calculating a second metric between the second transfer rate and the second power level;
   comparing the first metric to the second metric to determine which of the first and second metrics is greater; and
   servicing the first or second request associated with the greater metric by assigning the first or second transfer rate associated with the greater metric to the first or second request, respectively.

8. The method of claim 7 further comprising dequeuing the serviced request from a queue of pending requests.

9. A telecommunications system comprising a means for:
   calculating a first metric based on a first power level needed to support a first request at a first bit rate;
   calculating a second metric based on a second power level needed to support a second request at a second bit rate;
   selecting the first or second metric that meets a predefined criterion; and
   servicing the first or second request associated with the selected metric; and
   setting the first or second power level to infinity if the system has insufficient power to support the first or second request, respectively, at the first or second bit rate;
   wherein calculating the first and second metrics comprises dividing the first and second bit rates by the first and second power levels, respectively.

10. The telecommunications system of claim 9 wherein servicing the first or second request includes assigning the first or second bit rate associated with the selected metric to the first or second request associated with the selected metric.

11. The telecommunications system of claim 9 wherein the first and second bit rates are equal.

12. A system for maximizing throughput in a telecommunications network constrained by power and supporting a plurality of transfer rates, the system comprising:
   a processing center accessible to the network, the processing center operable to communicate with one or more communication devices;
   a buffer accessible to the processing center, the buffer operable to store a first request from the communication device;
   a memory accessible to the processing center and the buffer, the memory including software instructions for the processing center for:
   calculating whether the network includes sufficient power to transfer the first request at a first transfer rate;
   calculating whether the network includes sufficient power to transfer the first request at a second transfer rate;
   determining whether the first or second transfer rate will transfer the first request more efficiently in terms of power; and
   transferring the request using the more efficient transfer rate;
   wherein the buffer is operable to store a second request from a second communication device;
   and wherein the software instructions further include:
      calculating whether the network includes sufficient power to transfer the second request at the first and second transfer rates;

determining which of the first and second requests can be transferred more efficiently by the first or second transfer rates in terms of power;

selecting the first or second request that can be transferred more efficiently; and transferring the selected first or second request using the more efficient transfer rate.

13. The system of claim 12 wherein determining whether the first or second transfer rate is more efficient includes calculating whether more power is required to transfer the first request at the first or second rate.

14. The system of claim 12 wherein the first and second requests can be simultaneously transmitted after assigning one of the first and second transfers to each of the first and second requests.

15. The system of claim 12 wherein at least one operating parameter of the communication device is included when calculating whether the network includes sufficient power to transfer the first request at the first and second transfer rates.

* * * * *